(12) United States Patent
McDonald

(10) Patent No.: US 12,128,830 B1
(45) Date of Patent: Oct. 29, 2024

(54) PERSONAL ELECTRONIC MOUNTING DEVICE

(71) Applicant: Jerry McDonald, Dayton, TX (US)

(72) Inventor: Jerry McDonald, Dayton, TX (US)

( * ) Notice: Subject to any disclaimer, the term of this patent is extended or adjusted under 35 U.S.C. 154(b) by 0 days.

(21) Appl. No.: 18/207,220

(22) Filed: Jun. 8, 2023

(51) Int. Cl.
*F16M 11/00* (2006.01)
*B60R 11/02* (2006.01)
*B60R 11/00* (2006.01)

(52) U.S. Cl.
CPC ...... *B60R 11/0258* (2013.01); *B60R 11/0241* (2013.01); *B60R 2011/0003* (2013.01); *B60R 2011/0068* (2013.01); *B60R 2011/0084* (2013.01)

(58) Field of Classification Search
CPC ............... B60R 11/0258; B60R 11/024; B60R 2011/0003; B60R 2011/0068; B60R 2011/0084
See application file for complete search history.

(56) References Cited

U.S. PATENT DOCUMENTS

| | | | |
|---|---|---|---|
| 5,769,369 A | 6/1998 | Meinel | |
| 6,315,252 B1 | 11/2001 | Schultz | |
| 6,412,426 B1 | 7/2002 | Holloway, Jr. | |
| D558,769 S * | 1/2008 | Krieger | D14/496 |
| 7,336,258 B1 * | 2/2008 | Goetsch | G06F 3/039 |
| | | | 248/278.1 |
| D691,149 S | 10/2013 | Breton | |
| 9,162,630 B2 * | 10/2015 | Pluta | B60R 11/02 |
| 9,695,849 B2 | 7/2017 | Zhou | |
| 9,743,759 B1 | 8/2017 | Ramirez | |
| D877,043 S * | 3/2020 | MacNeil | D12/415 |
| 10,876,677 B2 | 12/2020 | Green | |
| D920,219 S * | 5/2021 | Iverson | D12/415 |
| 11,091,097 B1 * | 8/2021 | Woodward | B60R 11/00 |
| 11,117,526 B2 * | 9/2021 | Iverson | B60R 11/02 |
| D943,571 S * | 2/2022 | Deng | D12/415 |
| D955,377 S * | 6/2022 | Iverson | D14/253 |
| D964,912 S * | 9/2022 | Wang | D12/419 |
| D972,549 S * | 12/2022 | Yang | D12/419 |
| D985,571 S * | 5/2023 | You | D14/447 |
| D991,245 S * | 7/2023 | Koo | D14/253 |
| D1,004,525 S * | 11/2023 | Liu | D12/419 |
| D1,007,401 S * | 12/2023 | McSweyn | D12/415 |
| D1,021,753 S * | 4/2024 | Liang | D12/419 |
| D1,022,982 S * | 4/2024 | Dai | D12/419 |
| 2012/0187257 A1 | 7/2012 | Zou | |
| 2022/0212608 A1 * | 7/2022 | McSweyn | B60R 11/02 |

FOREIGN PATENT DOCUMENTS

WO    WO2015132565    9/2015

* cited by examiner

*Primary Examiner* — Amy J. Sterling (57) ABSTRACT

A personal electronic mounting device for mounting a personal electronic device in a vehicle includes a cylinder that is comprised of a weighted material to facilitate the cylinder to be stood upright in a vehicle without tipping over. A tube is attached to and extends upwardly from the cylinder and a pole is slidably inserted into the tube thereby facilitating the pole to be adjusted to a desired height. The pole has a mounting element that is spaced from the tube. A panel is attached to the mounting element to facilitate an electronic device to be mounted to the panel thereby facilitating the electronic device to be visible to a driver of the vehicle.

10 Claims, 7 Drawing Sheets

PERSONAL ELECTRONIC MOUNTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to personal electronic mounting devices and more particularly pertains to a new personal electronic mounting device for mounting a personal electronic device in a vehicle. The device includes a weighted cylinder that can be positioned in a vehicle without tipping over, a tube extending upwardly from the weighted cylinder and a pole insertable into the tube. The pole includes a mounting element and a panel is attached to the mounting element to facilitate a personal electronic device to be mounted to the panel.

(2) Description of Related Art Including Information Disclosed Under 37 CFR 1.97 and 1.98

The prior art relates to personal electronic mounting devices including a variety of electronic device mounts that each at least includes a planar base and a gripping unit disposed on the planar base for engaging a personal electronic device, and a variety of electronic device mounts that each includes a cylindrical base, a bendable member extending upwardly from the cylindrical base and a mount attached to the bendable member. In no instance does the prior art disclose a personal electronic mounting device that includes a weighted cylindrical base and a mounting element that lies on a horizontal plane.

BRIEF SUMMARY OF THE INVENTION

An embodiment of the disclosure meets the needs presented above by generally comprising a cylinder that is comprised of a weighted material to facilitate the cylinder to be stood upright in a vehicle without tipping over. A tube is attached to and extends upwardly from the cylinder and a pole is slidably inserted into the tube thereby facilitating the pole to be adjusted to a desired height. The pole has a mounting element that is spaced from the tube. A panel is attached to the mounting element to facilitate an electronic device to be mounted to the panel thereby facilitating the electronic device to be visible to a driver of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new personal electronic mounting device embodying the principles and concepts of an embodiment of the disclosure and generally designated by the reference numeral 10 will be described.

As best illustrated in FIGS. 1 through 8, the personal electronic mounting device 10 generally comprises a cylinder 12 that is comprised of a weighted material thereby facilitating the cylinder 12 to be stood upright in a vehicle 14 without tipping over. The cylinder 12 has a top end 16 and the cylinder 12 is substantially hollow. Additionally, the top end 16 has a hole 18 extending into an interior of the cylinder 12 and the hole 18 is centrally positioned on the top end 16. The cylinder 12 may have a height ranging between approximately 60.0 cm and 90.0 cm and a weight ranging between approximately 13.0 kg and 18.0 kg. Furthermore, the vehicle 14 may comprise a cargo vehicle, such as a semi tractor, or other type of commercial vehicle that is commonly driven for extended periods of time. As is most clearly shown in FIG. 6, the cylinder 12 may be filled with a weighted material 19 to inhibit the cylinder 12 from tipping.

A tube 20 is attached to and extends upwardly from the cylinder 12 and the tube 20 has a bottom end 22 and a top end 24. The top end 24 of the tube 20 is open and the tube 20 has a lip 26 extending outwardly from an outer surface 28 of the tube 20 and the lip is aligned with the bottom end 22 of the tube 20. The tube 20 extends through the hole 18 in the top end 16 of the cylinder 12 having the lip 26 abutting a lower surface 30 of the top end 16 of the cylinder 12 thereby inhibiting the tube 20 from being pulled upwardly through the hole 18. The tube 20 has a collar 32 extending around the outer surface 28 and the collar 32 is aligned with the top end 24 of the tube 20. A screw 34 is included which has a shaft 36 extending through the collar 32 and a knob 38 that is disposed on the shaft 36 for gripping and rotating the shaft 36.

A pole 40 is slidably inserted into the tube 20 thereby facilitating the pole 40 to be adjusted to a desired height. The pole 40 has a mounting element 42 that is spaced from the tube 20 and the pole 40 extends into the top end 16 of the tube 20. The shaft of the screw 34 is tightened against the pole 40 when the screw 34 is tightened for retaining the pole 40 at the desired height. The shaft of the screw 34 is disengaged from the pole 40 when the screw 34 is loosened for facilitating the height of the pole 40 to be adjusted. The pole 40 has a series of members 44 intersecting each other at a perpendicular orientation such that the series of members 44 forms a rectangle. Furthermore, the series of members 44 defines the mounting element 42. A lowermost one of the series of members 46 is integrated into a top end 47 of the pole 40 at a point that is centrally located on the lowermost member 46. The tube 20 and the pole 40 may have a maximum length of approximately 100.0 cm and a minimum length of approximately 30.0 cm.

A panel 48 is attached to the mounting element 42 to facilitate a personal electronic device 50 to be mounted to the panel 48 thereby facilitating the personal electronic device 50 to be visible to a driver 52 of the vehicle 14. The personal electronic device 50 may comprise a smart phone or other similar type of device that is commonly employed for electronic navigation, for example. The panel 48 has a rear surface 54 that is positioned against the plurality of intersecting members 44. The panel 48 has a front surface 56 that is exposed with respect to the plurality of intersecting members 44 to facilitate the personal electronic device 50 to be mounted to the front surface 56. The panel 48 is comprised of a translucent material thereby facilitating light to pass through the panel 48 to facilitate the driver 52 to see through the panel 48. The panel 48 may have a length ranging between approximately 15.0 cm and 23.0 cm, a height ranging between approximately 23.0 cm and 28.0 cm and a thickness ranging between 6.0 mm and 8.0 mm. A plurality of fasteners 58 is provided and each of the plurality of fasteners 58 is extendable through the panel 48 to engage a respective one of the series of intersecting members 44 to retain the panel 48 on the series of intersecting members 44. Each of the fasteners 58 may comprise a screw 34 or other type of releasable, penetrating fastener.

Figure 8:
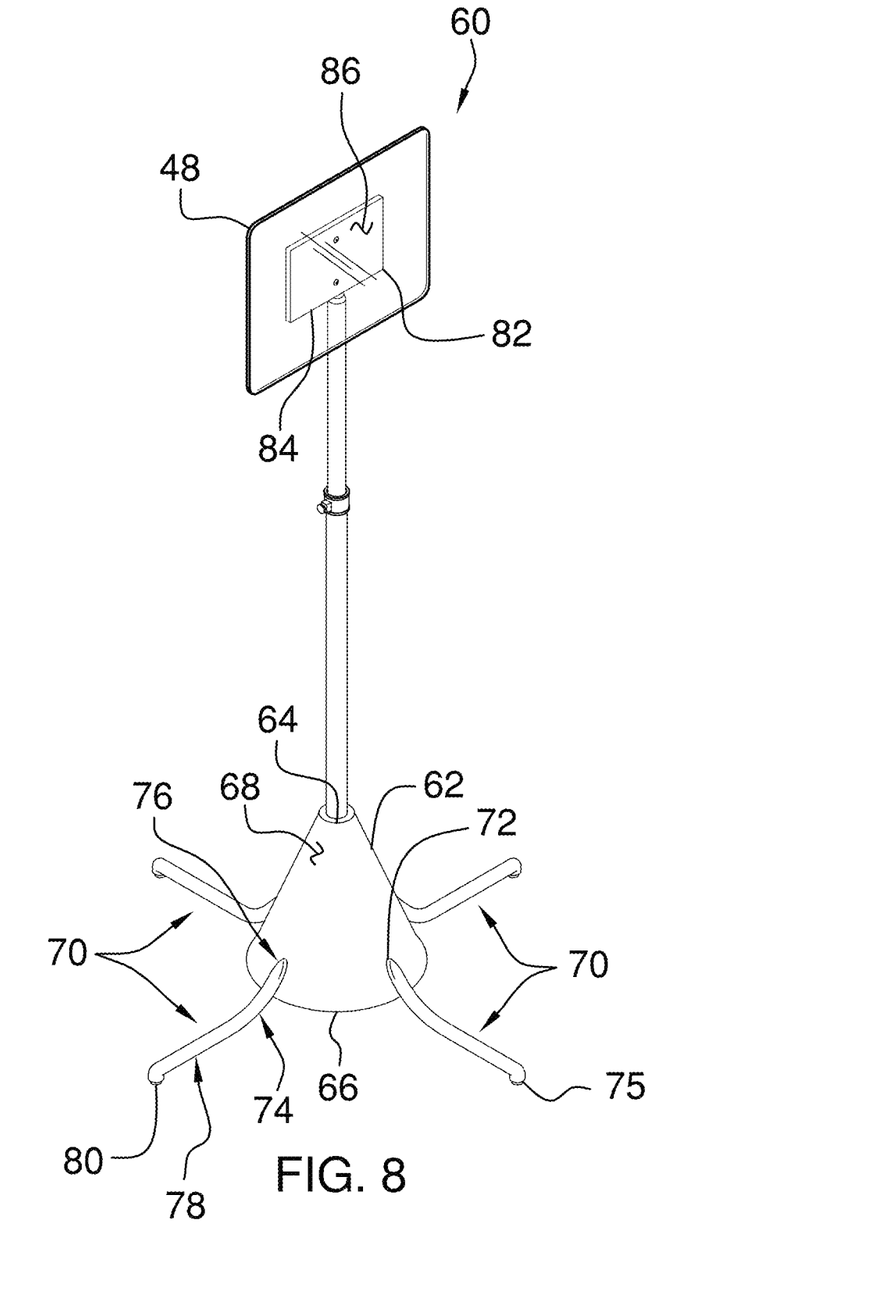
FIG. 8 is a perspective view of an alternative embodiment of the disclosure.

In an alternative embodiment 60 as is most clearly shown in FIG. 8, a cone 62 is provided which has a top end 64 to which the bottom end 22 of the tube 20 is attached. The cone 62 has a bottom end 66 and an outer surface 68 with flares outwardly between the top end 64 of the cone 62 and the bottom end 66 of the cone 62. Continuing in the alternative embodiment 60, a plurality of legs 70 is provided which each has a first end 72 that is coupled to the outer surface of the cone 62. Each of the legs 70 has a curve 74 that is positioned closer to the first end 72 of the legs 70 than a second end 75 of the legs 70 which defines a first portion 76 of the legs 70 and a second portion 78 of the legs 70. The first end 72 of the legs 70 is associated with the first portion 76 and the second end 75 of the legs 70 is associated with the second portion 78.

The second portion 78 of each of the legs 70 lies on a plane that is aligned with the bottom end 22 of the cone 62. Additionally, the legs 70 are evenly spaced apart from each other and are distributed around the cone 62. Each of the legs 70 includes a foot 80 extending downwardly from the legs 70 at a point located adjacent to the second end 74 of the legs 70 which can rest on a support surface. The alternative embodiment 60 further includes a plate 82 which has a bottom edge 84 that is coupled to the top end 47 of the pole 40. The plate 82 has a forward surface 86 to which the rear surface 54 of the panel 48 is fixed.

Figure 1:
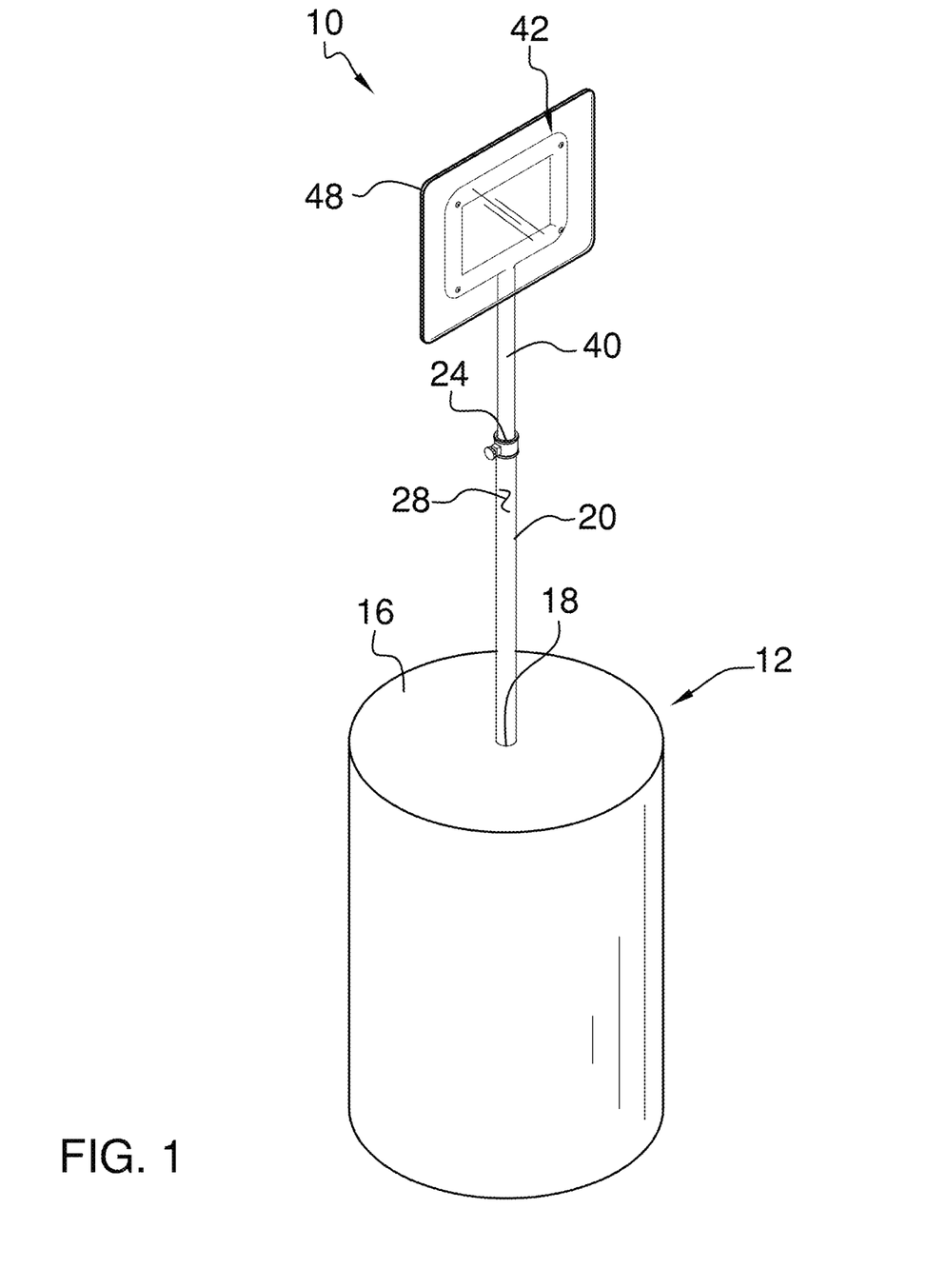
FIG. 1 is a front perspective view of a personal electronic mounting device according to an embodiment of the disclosure.
Figure 2:
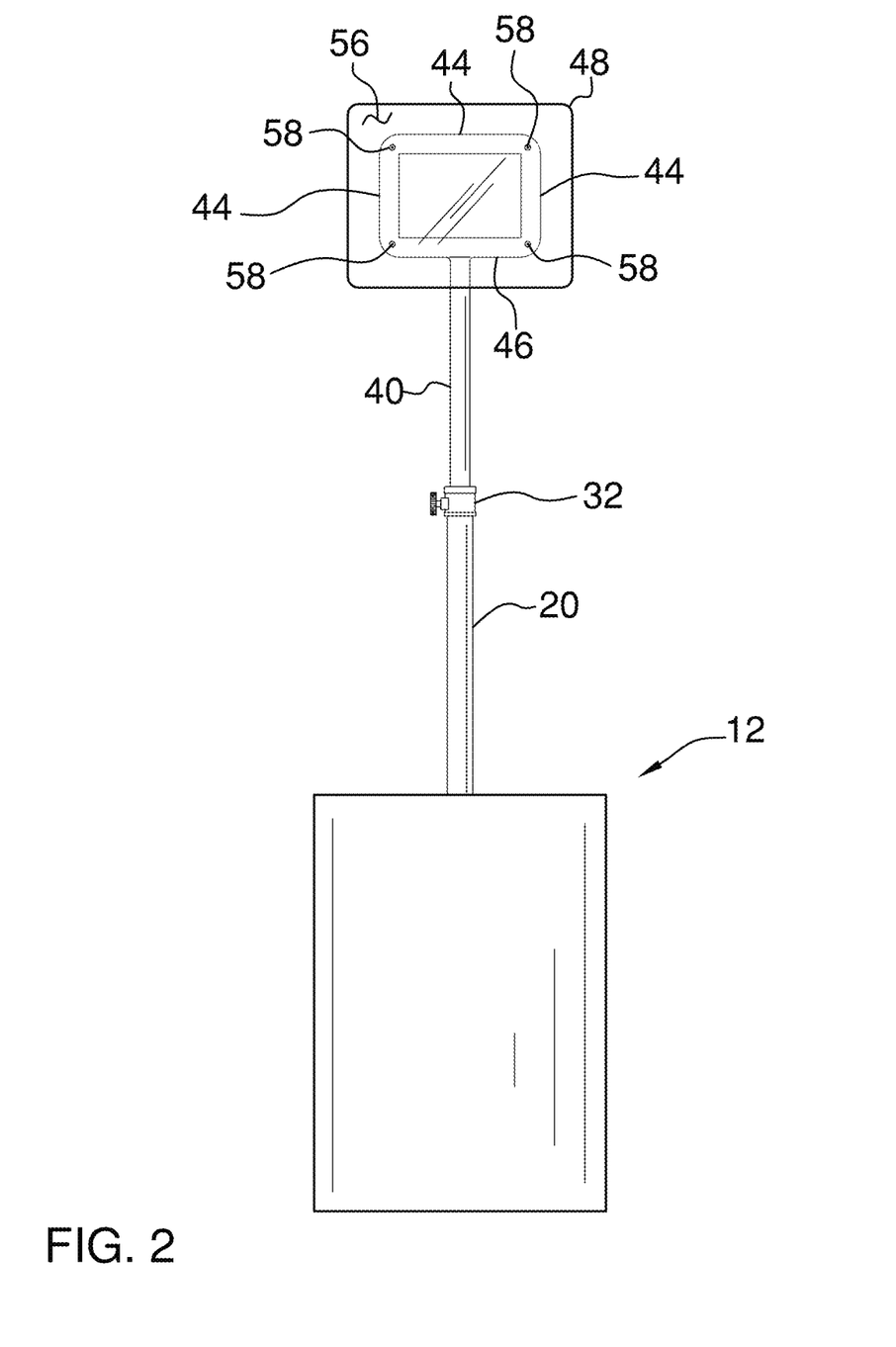
FIG. 2 is a front view of an embodiment of the disclosure.
Figure 3:
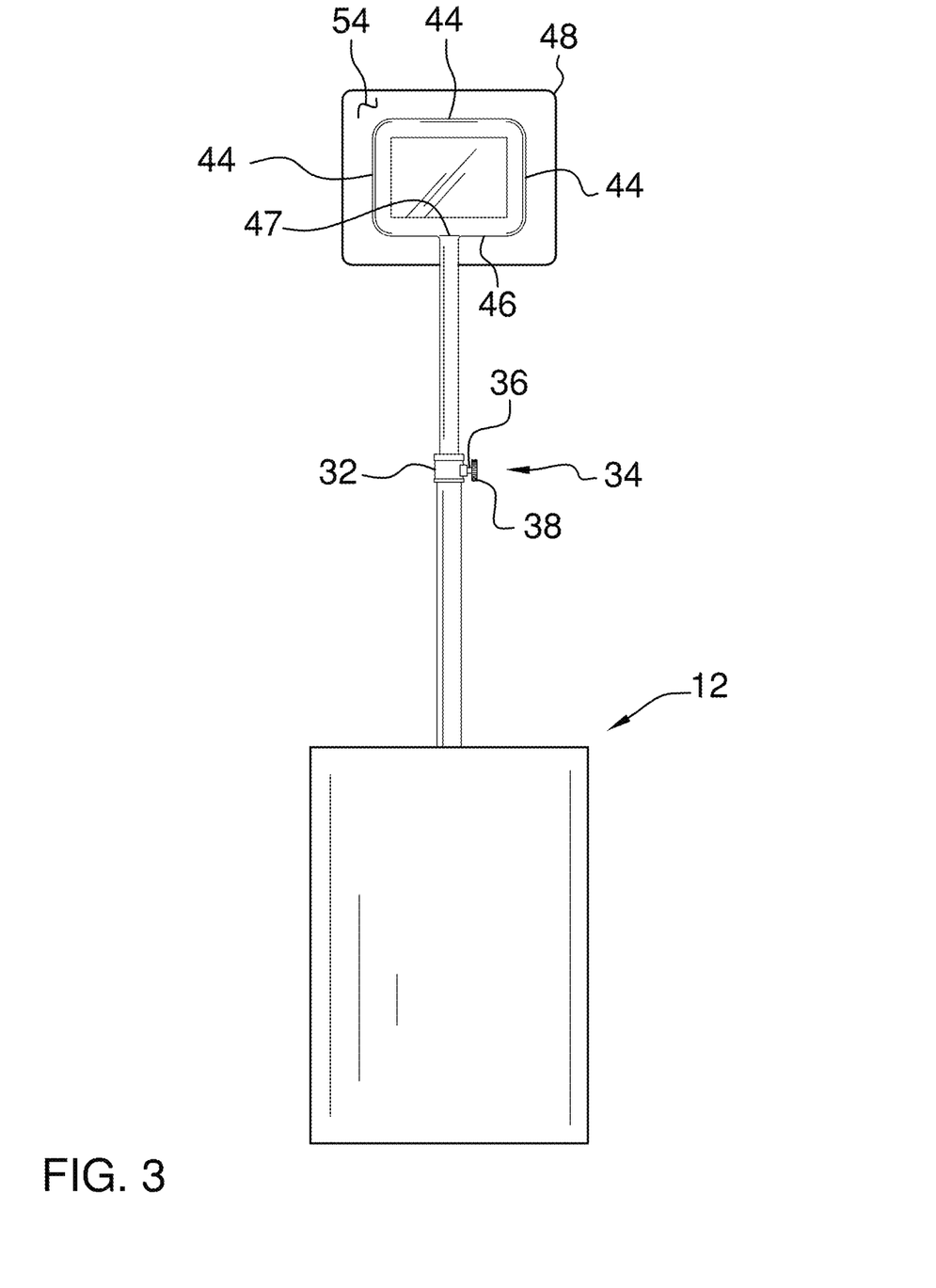
FIG. 3 is a back view of an embodiment of the disclosure.
Figure 4:
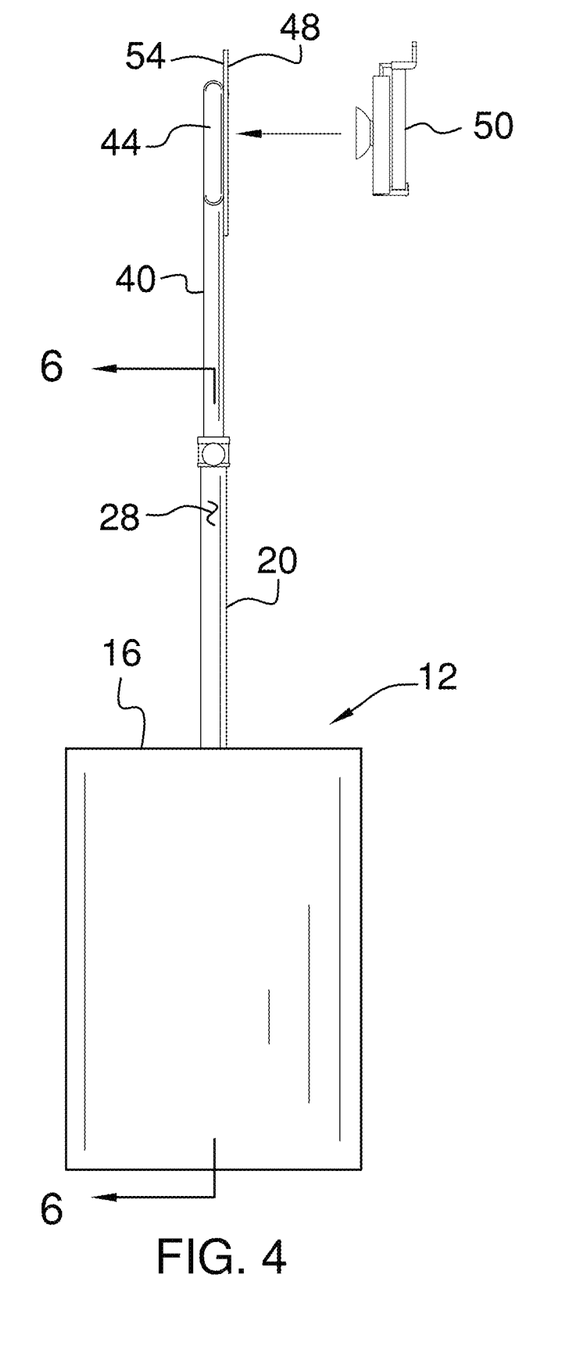
FIG. 4 is a right side view of an embodiment of the disclosure.
Figure 5:
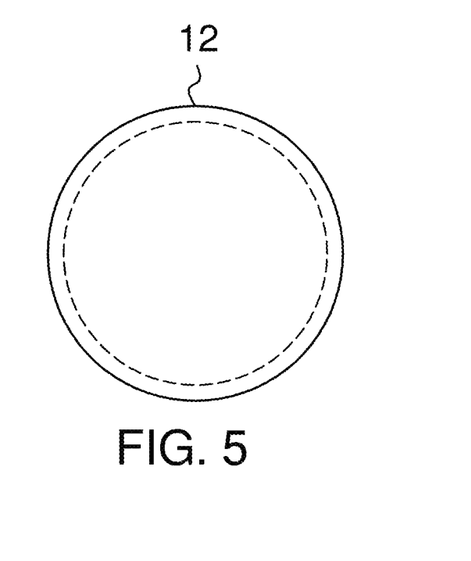
FIG. 5 is a bottom view of an embodiment of the disclosure.
Figure 6:
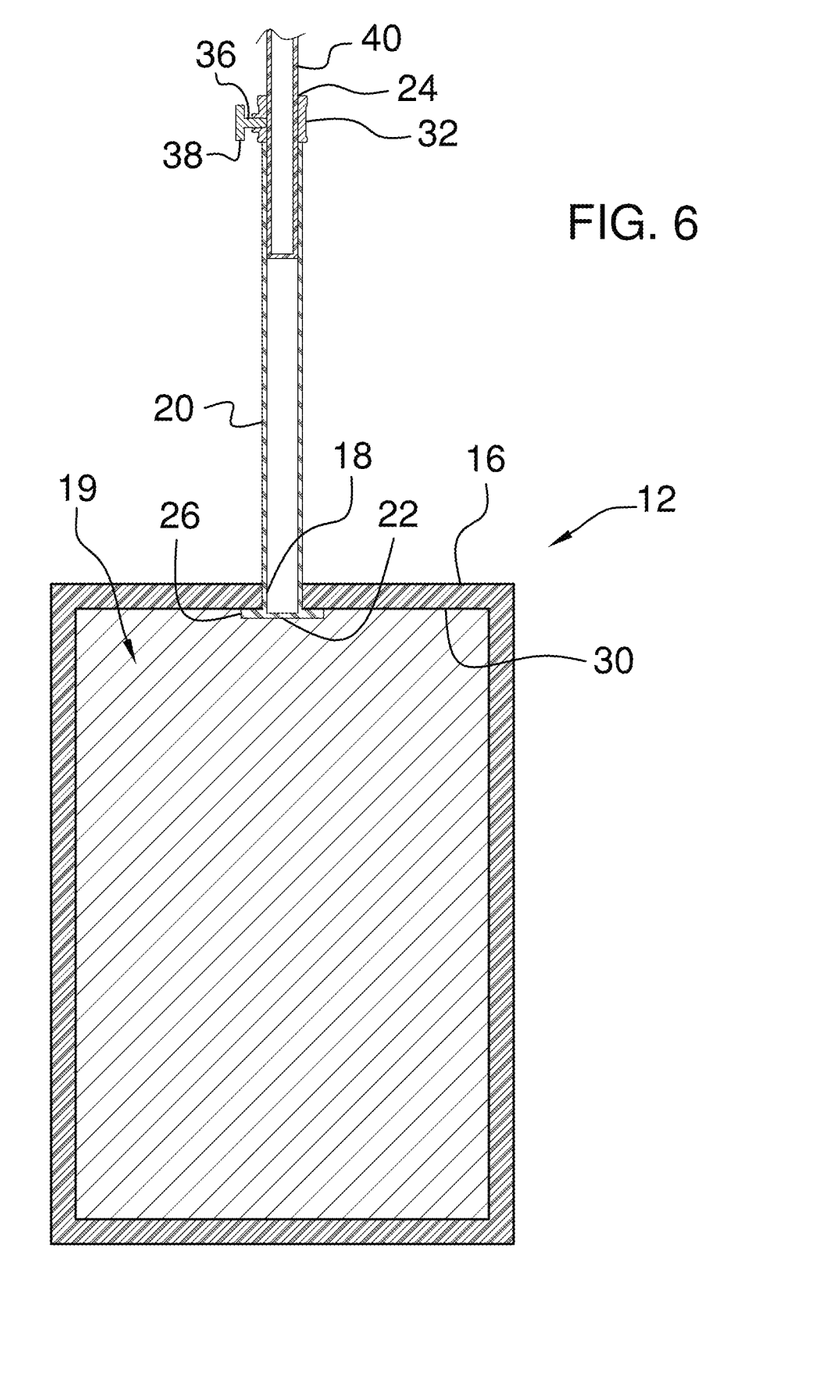
FIG. 6 is a cross sectional view taken along line 6-6 of FIG. 4 of an embodiment of the disclosure.
Figure 7:
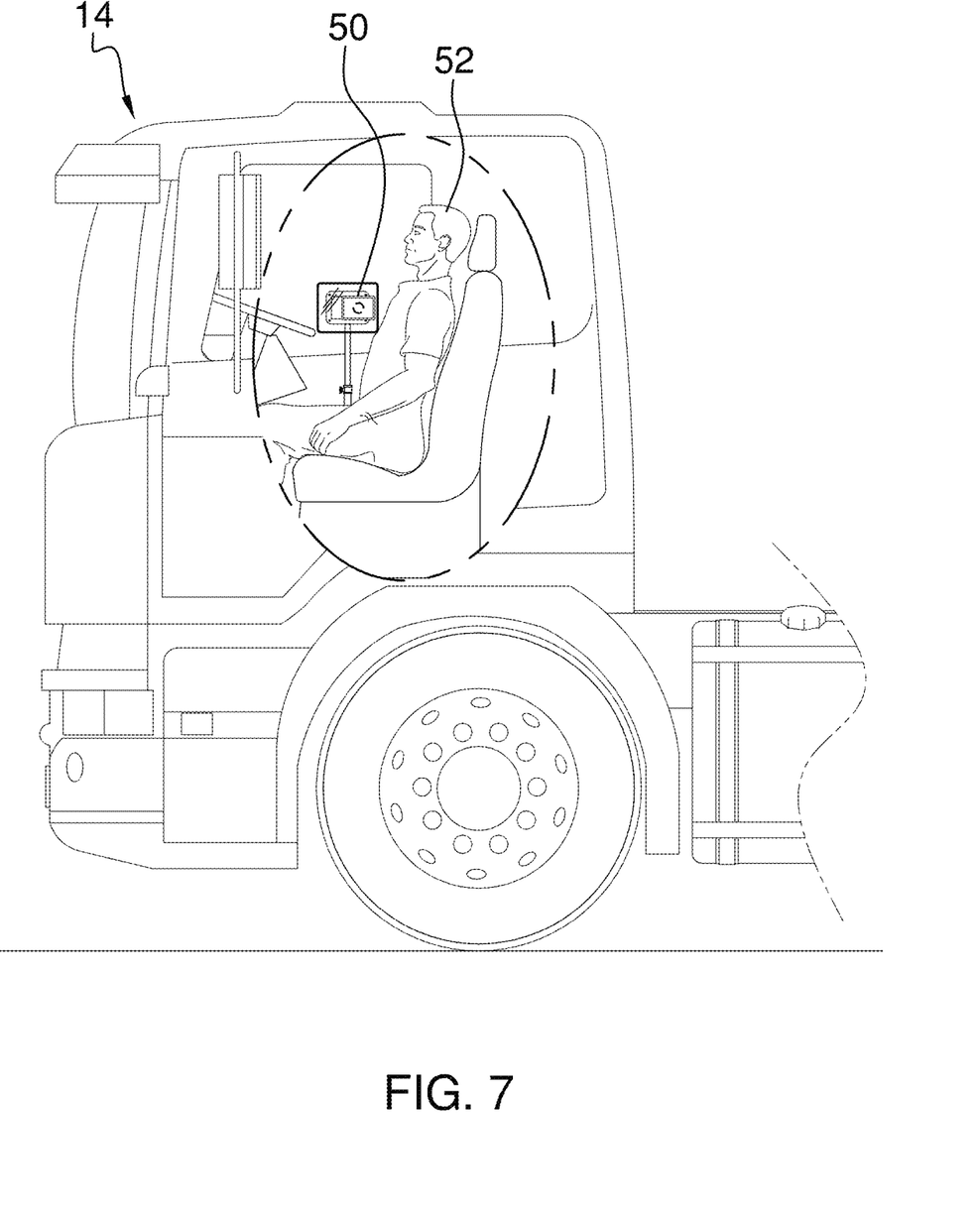
FIG. 7 is a perspective in-use view of an embodiment of the disclosure.

In use, the cylinder 12 is positioned in the vehicle 14 such that the panel 48 does not obstruct the line of sight to rear view mirrors 88 of the vehicle 14 from the driver's seat 90 of the vehicle 14. The height of the pole 40 is adjusted and the screw 34 is tightened to retain the pole 40 at the desired height. In this way the personal electronic device 50 can be mounted to the panel 48 at a location that facilitates the personal electronic device 50 to be easily visible to the driver 52 without obstructing the driver's 52 view of the rear view mirrors 88. In this way the driver 52 can employ a global positioning system application, for example, to navigate without running the risk of receiving a citation from law enforcement for having an obstructed view of the rear view mirrors 88. Furthermore, the panel 48 has sufficient dimensions to facilitate more than one personal electronic device 50 to be mounted to the panel 48.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A personal electronic mounting device for displaying an electronic device in a vehicle in an orientation that does not obstruct line of sight to rear view mirrors of the vehicle, said device comprising:
   a cylinder being comprised of a weighted material wherein said cylinder is configured to be stood upright in a vehicle without tipping over;

a tube being attached to and extending upwardly from said cylinder;

a pole being slidably inserted into said tube thereby facilitating said pole to be adjusted to a desired height, said pole having a mounting element being spaced from said tube;

a panel being attached to said mounting element having said panel lying on a horizontal plane wherein said panel is configured to facilitate an electronic device to be mounted to said panel thereby facilitating the electronic device to be visible to a driver of the vehicle;

said cylinder has a top end, said cylinder being substantially hollow, said top end having a hole extending into an interior of said cylinder, said hole being centrally positioned on said top end; and said tube has a bottom end and a top end, said top end of said tube being open, said tube having a lip extending outwardly from an outer surface of said tube, said lip being aligned with said bottom end of said tube, said tube extending through said hole in said top end of said cylinder having said lip abutting a lower surface of said top end of said cylinder thereby inhibiting said tube from being pulled upwardly through said hole.

2. The device according to claim 1, wherein:

said tube having a collar extending around said outer surface, said collar being aligned with said top end of said tube;

said device includes a screw having a shaft extending through said collar and a knob disposed on said shaft for gripping and rotating said shaft; and said pole extends into said top end of said tube, said shaft of said screw being tightened against said pole when said screw is tightened for retaining said pole at said desired height, said shaft of said screw being disengaged from said pole when said screw is loosened for facilitating the height of said pole to be adjusted.

3. A personal electronic mounting device for displaying an electronic device in a vehicle in an orientation that does not obstruct line of sight to rear view mirrors of the vehicle, said device comprising:

a cylinder being comprised of a weighted material wherein said cylinder is configured to be stood upright in a vehicle without tipping over;

a tube being attached to and extending upwardly from said cylinder;

a pole being slidably inserted into said tube thereby facilitating said pole to be adjusted to a desired height, said pole having a mounting element being spaced from said tube;

a panel being attached to said mounting element having said panel lying on a horizontal plane wherein said panel is configured to facilitate an electronic device to be mounted to said panel thereby facilitating the electronic device to be visible to a driver of the vehicle; and wherein said pole has a series of members intersecting each other at a perpendicular orientation such that said series of members forms a rectangle such that said series of members defines said mounting element, a lowermost one of said series of members being integrated into a top end of said pole at a point being centrally located on said lowermost member.

4. The device according to claim 3, wherein said panel has a rear surface being positioned against said plurality of intersecting members, said panel having a front surface being exposed with respect to said plurality of intersecting members wherein said front surface is configured to have the electronic device mounted to said front surface, said panel being comprised of a translucent material thereby facilitating light to pass through said panel wherein said panel is configured to facilitate the driver to see through said panel.

5. The device according to claim 2, further comprising a plurality of fasteners, each of said plurality of fasteners being extendable through said panel to engage a respective one of said series of intersecting members thereby retaining said panel on said series of intersecting members.

6. The device according to claim 4, further comprising:

said cylinder having a top end, said cylinder being substantially hollow, said top end having a hole extending into an interior of said cylinder, said hole being centrally positioned on said top end;

said tube having a bottom end and a top end, said top end of said tube being open, said tube having a lip extending outwardly from an outer surface of said tube, said lip being aligned with said bottom end of said tube, said tube extending through said hole in said top end of said cylinder having said lip abutting a lower surface of said top end of said cylinder thereby inhibiting said tube from being pulled upwardly through said hole, said tube having a collar extending around said outer surface, said collar being aligned with said top end of said tube;

a screw having a shaft extending through said collar and a knob disposed on said shaft for gripping and rotating said shaft;

said pole extending into said top end of said tube, said shaft of said screw being tightened against said pole when said screw is tightened for retaining said pole at said desired height, said shaft of said screw being disengaged from said pole when said screw is loosened for facilitating the height of said pole to be adjusted;

said panel having a rear surface being positioned against said plurality of intersecting members, said panel having a front surface being exposed with respect to said plurality of intersecting members wherein said front surface is configured to have the electronic device mounted to said front surface, said panel being comprised of a translucent material thereby facilitating light to pass through said panel wherein said panel is configured to facilitate the driver to see through said panel; and a plurality of fasteners, each of said plurality of fasteners being extendable through said panel to engage a respective one of said series of intersecting members thereby retaining said panel on said series of intersecting members.

7. The device according to claim 6, further comprising a cone having a top end to which said bottom end of said tube is attached, said cone having a bottom end and an outer surface with flares outwardly between said top end of said cone and said bottom end of said cone.

8. The device according to claim 7, further comprising a plurality of legs, each of said legs having a first end being coupled to said outer surface of said cone, each of said legs having a curve being positioned closer to said first end of said legs than a second end of said legs which defines a first portion of said legs and a second portion of said legs, said first end of said legs being associated with said first portion, said second end of said legs being associated with said second portion, said second portion of each of said legs lying on a plane being aligned with said bottom end of said cone, said plurality of legs being evenly spaced apart from each other and being distributed around said cone, each of said legs including a foot extending downwardly from said legs at a point located adjacent to said second end of said legs wherein said foot on each of said legs is configured to rest on a support surface.

9. The device according to claim 6, further comprising a plate having a bottom edge being coupled to said top end of said pole, said plate having a forward surface to which said rear surface of said panel is fixed.

10. A personal electronic mounting system for displaying an electronic device in a vehicle in an orientation that does not obstruct line of sight to rear view mirrors of the vehicle, said system comprising:
- a personal electronic device;
- a mounting unit for receiving said personal electronic device, said mounting unit including a suction cup being comprised of a deformable material wherein said suction cup is configured to be compressed against a surface thereby facilitating said suction cup to suctionally engage the surface;
- a cylinder being comprised of a weighted material wherein said cylinder is configured to be stood upright in a vehicle without tipping over, said cylinder having a top end, said cylinder being substantially hollow, said top end having a hole extending into an interior of said cylinder, said hole being centrally positioned on said top end;
- a tube being attached to and extending upwardly from said cylinder, said tube having a bottom end and a top end, said top end of said tube being open, said tube having a lip extending outwardly from an outer surface of said tube, said lip being aligned with said bottom end of said tube, said tube extending through said hole in said top end of said cylinder having said lip abutting a lower surface of said top end of said cylinder thereby inhibiting said tube from being pulled upwardly through said hole, said tube having a collar extending around said outer surface, said collar being aligned with said top end;
- a screw having a shaft extending through said collar and a knob disposed on said shaft for gripping and rotating said shaft;
- a pole being slidably inserted into said tube thereby facilitating said pole to be adjusted to a desired height, said pole having a mounting element being spaced from said tube, said pole extending into said top end of said tube, said shaft of said screw being tightened against said pole when said screw is tightened for retaining said pole at said desired height, said shaft of said screw being disengaged from said pole when said screw is loosened for facilitating the height of said pole to be adjusted, said pole having a series of members intersecting each other at a perpendicular orientation such that said series of members forms a rectangle such that said series of members defines said mounting element, a lowermost one of said series of members being integrated into a top end of said pole at a point being centrally located on said lowermost member;
- a panel being attached to said mounting element, said mounting unit being attachable to said panel to facilitate said personal electronic device to be visible to a driver of the vehicle, said panel having a rear surface being positioned against said plurality of intersecting members, said panel having a front surface being exposed with respect to said plurality of intersecting members, said suction cup on said mounting unit being compressible against said front surface thereby facilitating said personal electronic device to be mounted to said front surface, said panel being comprised of a translucent material thereby facilitating light to pass through said panel wherein said panel is configured to facilitate the driver to see through said panel; and
- a plurality of fasteners, each of said plurality of fasteners being extendable through said panel to engage a respective one of said series of intersecting members thereby retaining said panel on said series of intersecting members.

* * * * *